Dec. 3, 1963　　　C. D. SNELLING　　　3,112,890
FLUORESCENT LAMP FIXTURE
Filed May 16, 1961
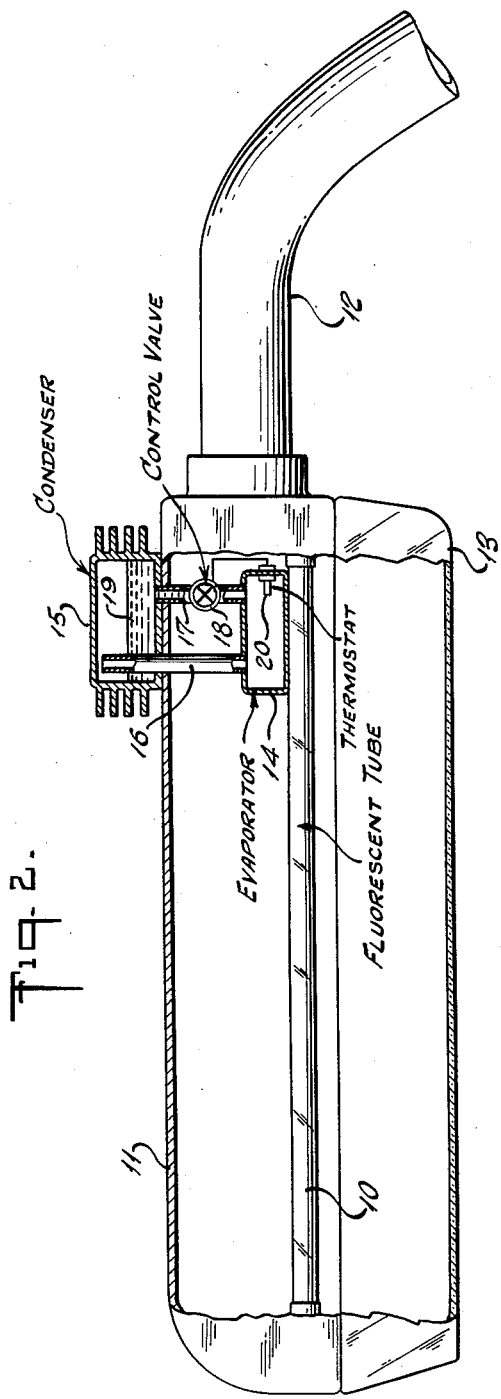
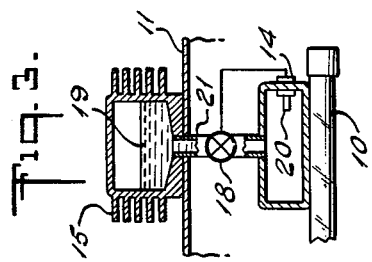
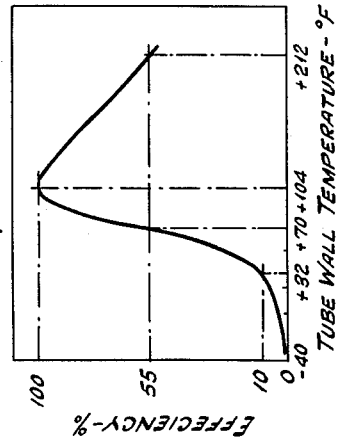
INVENTOR
CHARLES D. SNELLING
BY Ray C. Hopgood
ATTORNEY United States Patent Office  3,112,890
Patented Dec. 3, 1963

3,112,890
FLUORESCENT LAMP FIXTURE
Charles D. Snelling, Breinigsville, Pa.
Filed May 16, 1961, Ser. No. 110,523
2 Claims. (Cl. 240—51.11)

This invention relates in general to fluorescent lamp fixtures and in particular to fluorescent lamp fixtures containing spot temperature control devices operable to maintain a fluorescent tube near its optimum operating conditions under wide variations in ambient temperature. The invention can be used in connection with indoor or outdoor fluorescent lamp fixtures, but it is particularly useful in totally enclosed outdoor fixtures such as illuminaires or the like. The invention is characterized by a novel gravity-fed heat exchanger which is powered by the normal filament heat generated in the prior art fluorescent tubes when they are energized.

In the prior art it has been found that the efficiency of a fluorescent tube varies in accordance with the tube wall temperature thereof, the efficiency being maximum at approximately +104 degrees F. and dropping quite sharply far lower or higher temperatures in accordance with the curve shown in FIG. 1 of the attached drawing. In totally enclosed fixtures the low temperature side of this curve is not particularly troublesome, even when the fixtures are used out of doors, because the heat from the fluorescent tube warms the interior of the fixture and keeps the tube wall temperature high when the ambient temperature drops. When the ambient temperature rises, however, excessive heat is trapped in the fixture and the tube wall temperature moves into the high temperature side of its efficiency curve. The same thing happens in fixtures which are open at the bottom and closed at the top, although the problem is not so serious in partially enclosed fixtures as it is in totally enclosed fixtures.

It has also been found in the prior art that fluorescent tubes can be maintained at their most efficient temperature by controlling the temperature at a small spot on the tube wall. This can be done because the efficiency is not determined by tube wall temperature per se, but rather by the vapor pressure within the fluorescent tube, which varies as a function of tube wall temperature. In an overheated fluorescent tube it has been found that this vapor pressure can be reduced to its optimum level by cooling a single spot anywhere along the tube wall, as explained more fully in an article entitled "Controlled Cooling Boosts Outdoor Fluorescent Lamp Output" by H. A. Van Dusen, Jr., in the May 15, 1960 issue of Electric Light and Power magazine. In this article there is disclosed a thermoelectric spot cooler which can be used to cool a small spot on an overheated fluorescent tube. This prior art spot cooler comprises a small Peltier thermoelectric cooling device adapted to be mounted on a fluorescent tube, a D.-C. power supply adapted to produce an output voltage to operate the cooling device, a temperature sensing device adapted to measure the temperature of the cold spot, a voltage regulator for adjusting the output voltage of the power supply in accordance with the temperature of the cold spot to maintain a predetermined cold spot temperature, and a fan adapted to remove heat from the cooling fins of the thermoelectric cooling device. These structural units are all mounted within the enclosed fixture to form an internal convection system for transferring excess heat from the cold spot to other regions within the enclosed fixture.

Although this prior art spot cooling system does indeed improve the efficiency of fluorescent lamp fixtures, it suffers from several serious limitations and drawbacks.

In the first place, this prior art cooling system aggravates the overheated condition because of its electrical power supply and thermoelectric cooling device. These elements radiate heat due to their inherent inefficiency and thus continually add heat to the already overheated interior of the fixture. Furthermore, since these prior art systems circulate heat within the fixture instead of removing heat from the fixture, it is clear that they must operate continuously to maintain the cold spot, particularly in view of the additional excess heat that they generate when in operation. In addition, these prior art cooling systems increase the power requirements of the fluorescent fixture by approximately 10% at high ambient temperatures, and they are relatively unreliable because of their dependence on electrical components. They are also relatively complex in structure, relatively costly in manufacture, and relatively difficult to maintain in operation.

Accordingly, one object of this invention is to provide a fluorescent lamp fixture in which a fluorescent tube is maintained near its optimum operating temperature by a heat exchanger adapted to remove excess heat from the fixture.

Another object of this invention is to provide a novel spot cooling system utilizing a novel heat exchanger which is simpler in structure, more effective in action, and more reliable in operation than those heretofore known in the art.

A further object of this invention is to provide a novel fluorescent tube spot cooling device which is powered by gravity and by the heat which it is adapted to remove.

An additional object of this invention is to provide a simple, inexpensive, reliable spot cooling system which can be easily installed in prior art fluorescent fixtures to increase their efficiency of operation without increasing their power requirements.

Other objects and advantages of the invention will become apparent to those skilled in the art from the following description of one specific embodiment thereof, as illustrated by the attached drawings, in which:

FIG. 1 is a curve showing the efficiency of a fluorescent tube as a function of tube wall temperature;

FIG. 2 is a cutaway elevation view of one embodiment of the invention; and

FIG. 3 is a partial elevation section of a second embodiment of the invention.

In general terms, the novel structure of this invention comprises a gravity-fed heat exchanger containing an evaporator, a condenser, a fluid coupling thereinbetween, and a temperature responsive valve in the fluid coupling. The evaporator is mounted in contact with the tube wall of a fluorescent tube, and the condenser is mounted in contact with the ambient atmosphere. A volatile liquid is hermetically sealed within the heat exchanger system, and when the temperature responsive valve thereof is open the liquid is dropped into the evaporator where it is vaporized by heat from the tube wall. The vapor is driven from the evaporator to the condenser by the force of gravity, and after the vapor has condensed back to liquid form it is returned to the evaporator by the force of gravity, thus transferring heat from the fluorescent tube to the ambient atmosphere. The temperature responsive valve is adapted to open whenever the temperature of the cooled spot exceeds its optimum operating temperature and to close when the temperature thereof drops below its optimum level.

It should be noted that the heat exchanger of this invention requires no power supply other than the force of gravity and the excess heat which the device is adapted to remove. And since it has no power supply, the heat exchanger of this invention cannot conceivably add heat to the fixture or increase the power requirements thereof as in the prior art devices. It should also be noted that the heat exchanger of this invention removes heat from the fixture instead of circulating heat within the fixture, and that it requires no forced air circulation such as used in the prior art devices. Since the condenser of this invention is mounted in contact with the ambient atmosphere, which is significantly cooler than the interior of the fixture, the desired heat transfer will take place without the aid of forced air circulation. Thus the novel spot cooling system of this invention is driven, in every aspect of its operation, by natural forces which are present in any prior art fluorescent fixture.

FIG. 2 shows one specific embodiment of the invention which is adapted for use as an outdoor fluorescent lamp fixture. A fluorescent tube 10 is mounted in accordance with prior art techniques in a metal housing 11 which is adapted to be secured to a hollow lamp post 12 which supports the fixture and acts as a conduit for the electrical conductors leading thereto. The bottom of metal housing 11 is covered by a transparent bottom member 13 which is secured by means not shown and which, of course, is removable so that tube 10 can be replaced when it burns out. As thus far described the structure is similar to the prior art fixtures, and any suitable prior art materials and techniques can be used in fabricatory elements 10 through 13.

It is obvious that heat from the filament of fluorescent tube 10 will become trapped within housing 11 and its removable bottom member 13. Therefore, when the fluorescent tube is lit the temperature within the housing will rise until it reaches a level where the heat added to the housing by the fluorescent tube is equal to the heat lost by radiation and convection to the surrounding atmosphere. Since the heat radiated by the housing is dependent on the ambient temperature, this means that the temperature within the housing will be dependent on the ambient temperature. For example, suppose that some specific fixture stabilizes at a fluorescent tube wall temperature of 104 degrees F. when the ambient temperature is 32 degrees F. If the ambient temperature suddenly jumps to 104 degrees F. there would be no temperature differential between the interior and the exterior of the fixture and the transfer of heat by radiation and convection would therefore cease. The temperature within the housing would then build up to a much higher level, due to the trapped heat, until a large enough temperature differential existed between the interior and exterior of the housing to bleed away the heat added by the filaments. Under the conditions noted, this would occur when the temperature within the housing approached 200 degrees F. Thus it can be seen that these prior art fixtures will operate at maximum efficiency for only one ambient temperature level, and that their efficiency will drop markedly if the ambient temperature is raised or lowered from that level.

In accordance with this invention, the fluorescent tube 10 is maintained at its most efficient operating conditions by spot cooling a portion of the tube whenever the wall temperature thereof rises above its optimum temperature. This cooling is done by means of a novel spot cooling system which comprises an evaporator 14 mounted in contact with a portion of the wall of fluorescent tube 10, a condenser 15 mounted on top of housing 11, a vapor line 16 and a fluid line 17 coupled thereinbetween, a temperature responsive valve 18 in fluid line 17, and a volatile liquid 19 such as Freon 11 in condenser 15. Temperature responsive valve 18, which is opened and closed by a thermostat element 20 within evaporator 14, is set to open when the temperature within evaporator 14 rises above a predetermined level which defines the optimum operating temperature of the fluorescent tube. When the valve 18 opens, fluid 19 runs into evaporator 14 where it is evaporated and then returned in vapor form to condenser 15 through vapor line 16. This vapor condenses on the walls of condenser 15, which is preferably fitted with cooling fins, and thus transfers heat from the wall of fluorescent tube 10 to the surrounding atmosphere. This process continues until the temperature within evaporator 14 returns to its optimum level, at which time valve 18 closes and the heat transfer process ends.

It will be apparent to those skilled in the art that the above described system holds a portion of fluorescent tube 10 near its optimum operating temperature under wide variations of ambient temperature. It will also be apparent that the fixture as a whole should be adapted to stabilize at its optimum temperature at a relatively low ambient temperature because in the first instance the tube efficiency drops more rapidly for lower than optimum temperatures than for higher than optimum temperatures, and in the second instance the heat exchanger of this invention is only adapted to remove heat from the housing. The exact characteristics of the fixture, however, cannot be specified in general because they will depend on the particular environment and lamp size used in any specific embodiment of the invention.

FIG. 3 shows a second embodiment of the invention in which the vapor and fluid lines are combined in a single fluid coupling line 21. In this embodiment of the invention fluid is dropped into evaporator 14 through valve 18 and the vapor formed when the fluid evaporates is driven back through valve 18 and into condenser 15 because the vapor pressure is higher in evaporator 14 than it is in condener 15. In this particular arrangement some of the vapor from evaporator 14 would be condensed as it bubbled through the liquid standing in line 20 above valve 18.

It should be noted that the simple structure of this invention lends itself quite readily to installation in prior art fluorescent fixtures. The condenser 15 can be easily secured to the top of any fluorescent fixture by the simple expedient of drilling holes to receive pipes 16 and 17, along with any required machine screws. If a weather tight joint is required, this can be provided by a simple gasket between the condenser and the top of the fixture. The evaporator, of course, does not require any separate mounting because it is supported by pipes 16 and 17. The evaporator and condenser do not have to be mounted near one end of the fluorescent tube; they can be mounted in any convenient location so long as the condenser is higher than the evaporator, with respect to the earth's gravitational field, and the evaporator is in contact with a portion of the fluorescent tube wall. For better contact, the bottom of the evaporator is preferably curved to match the curvature of the tube wall.

From the foregoing description it will be apparent that this invention provides a novel fluorescent lamp fixture in which a fluorescent tube is maintained near its optimum operating temperature by a heat exchanger adapted to remove excess heat from the fixture. It will also be apparent that this invention provides a simple, inexpensive fluorescent tube spot cooling device which is powered by gravity and by the heat which it is adapted to remove. And it should be understood that this invention is by no means limited to the specific structures described herein since many modifications can be made in the structure disclosed without departing from the basic teaching of this invention. For example, the temperature responsive valve of this invention does not necessarily have to be controlled by a thermostat in the evaporator; it could just as well respond to variations in the gas pressure therein. Furthermore, the invention is not limited to totally enclosed outdoor fixtures, it can just as well be embodied in partially enclosed indoor fixtures. These and many other modifications will be apparent to those skilled in the art and this invention includes all modifications falling within the scope of the following claims.

I claim:

1. In a vapor lamp fixture comprising a housing and means associated therewith for receiving a vapor lamp the combination comprising, an evaporator mounted within said housing having a surface portion adapted to make heat conductive contact with a surface portion of a vapor lamp, a condenser mounted on the outside of said housing in contact with the ambient atmosphere and in cooperable and gravity-feeding relationship with said evaporator, a vaporizable fluid in said condenser, a fluid-conducting means coupling the condenser to the evaporator, and a thermostatically operable valve associated with fluid-conducting means adapted to control the flow of fluid from said condenser to said evaporator in accordance with the temperature near the surface portion of the lamp.

2. The combination of claim 1, wherein the fluid-conducting means comprise a first fluid-conducting conduit for gravity-feeding fluid from the condenser to the evaporator and a second fluid-conducting conduit for feeding vaporized fluid from the evaporator to the condenser, and wherein said thermostatically operable valve is associated with said first fluid-conducting conduit.

References Cited in the file of this patent

UNITED STATES PATENTS

| | | |
|---|---|---|
| 2,044,609 | Hedlund | June 6, 1936 |
| 2,226,797 | Anderson | Dec. 31, 1940 |
| 2,882,695 | Zwickl | Apr. 21, 1959 |
| 2,932,753 | Arnott et al. | Apr. 12, 1960 |
| 2,958,021 | Cornelison et al. | Oct. 25, 1960 |
| 3,035,419 | Wigert | May 22, 1962 |